Sept. 3, 1957 P. HERSCH 2,805,191
OXYGEN ANALYSIS OF GASES
Filed Oct. 14, 1954 3 Sheets-Sheet 1
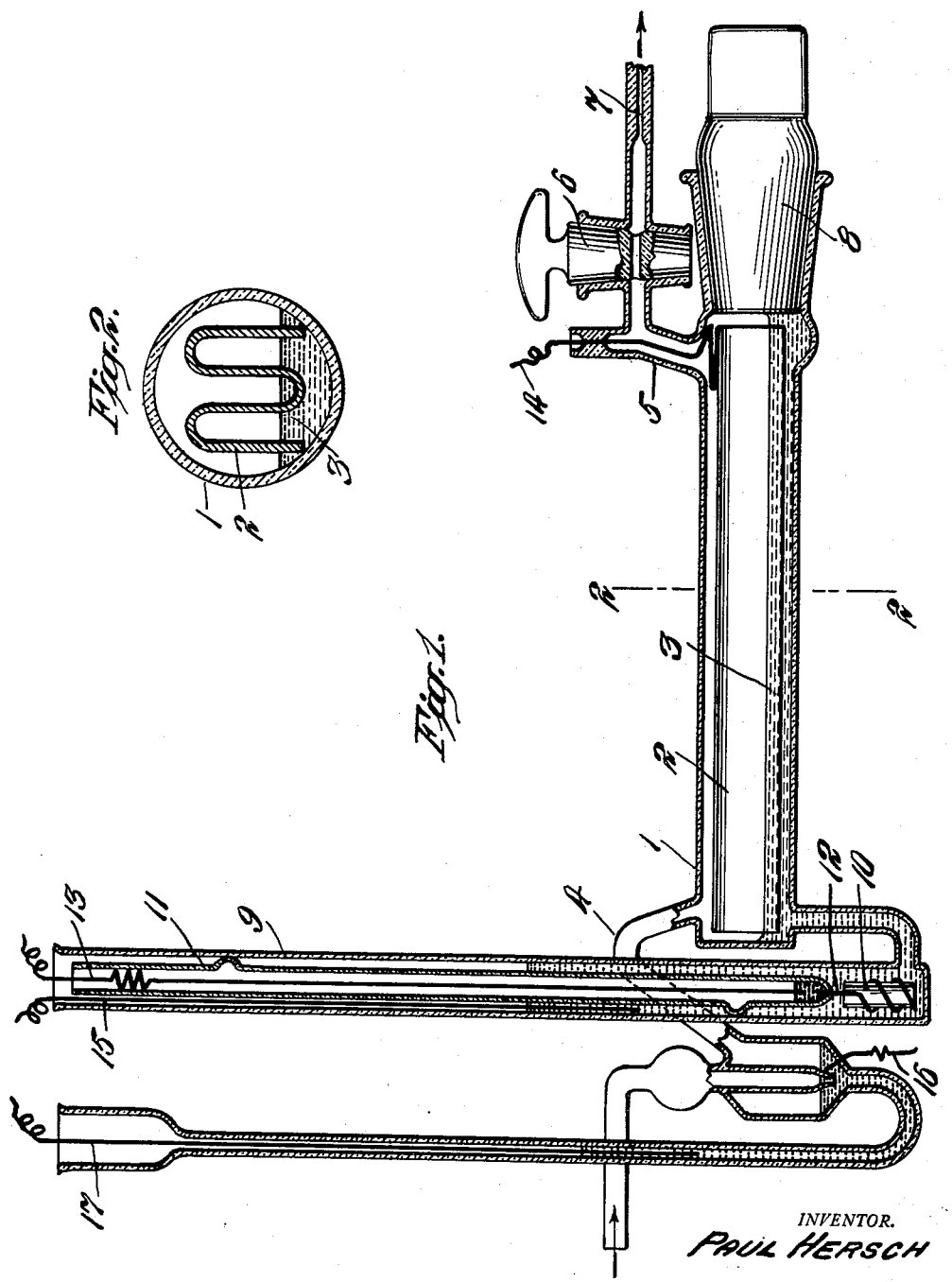
INVENTOR.
PAUL HERSCH
BY G. N. Deller
ATTORNEY

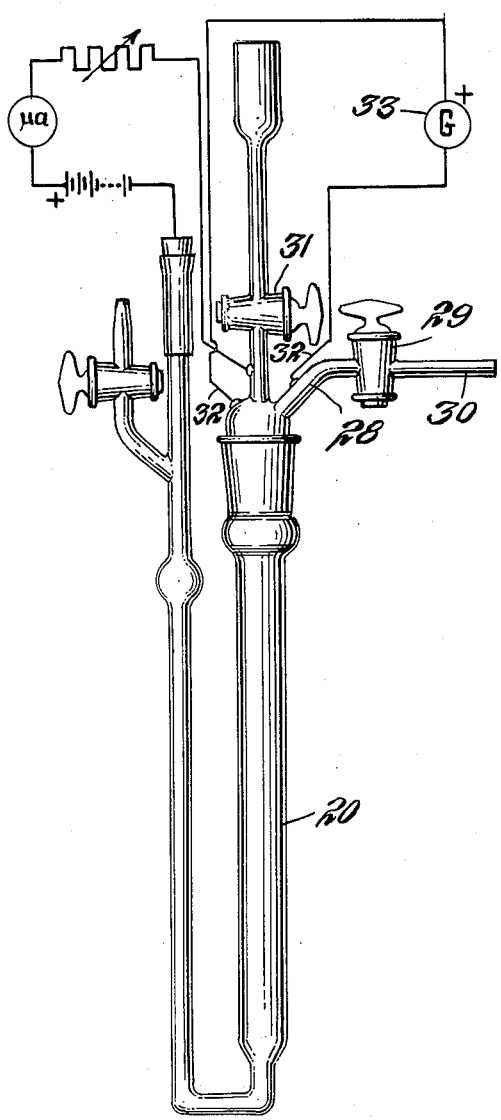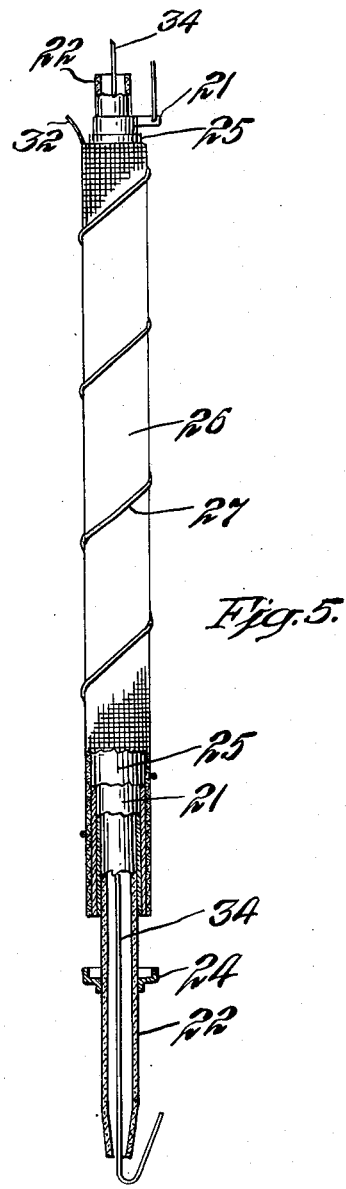

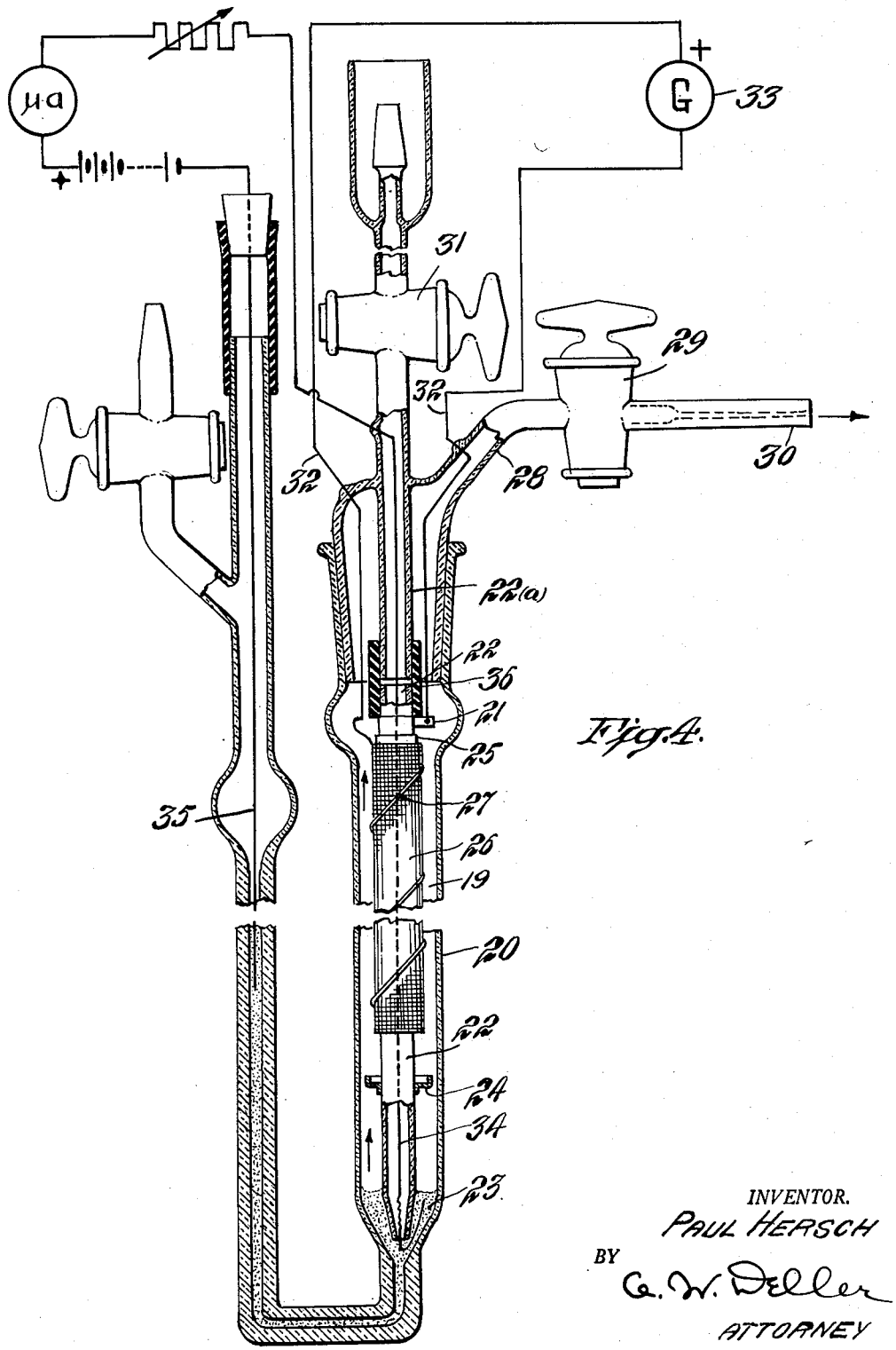

2,805,191

OXYGEN ANALYSIS OF GASES

Paul Hersch, Birmingham, England, assignor to The International Nickel Company, Inc., New York, N. Y., a corporation of Delaware Application October 14, 1954, Serial No. 462,346

Claims priority, application Great Britain January 16, 1952

17 Claims. (Cl. 204—1)

The present invention relates to the detection and measurement of the concentration of oxygen in other gases and, more particularly, to the estimation and measurement of small traces of oxygen in other gases.

Heretofore, the art has utilized conventional methods of gas analysis based on such factors as chemical absorption, heat of combustion, thermal conductivity, paramagnetism, etc., all requiring cumbersome apparatus and, moreover, being unreliable and even quite impracticable if only traces of oxygen are present. It is well known that gaseous oxygen can be produced by the electrolysis of a suitable electrolyte and that the amount of gas evolved is proportional to the current flowing in the cell. It is also known that oxygen can be absorbed into such a system at one of the electrodes so as to produce current. It has been proposed to determine oxygen by means of an electrochemical cell comprising a partly or periodically immersed, oxidizable metal electrode (e. g., copper), and electrolyte promoting the oxidation of this metal by dissolving its oxide (e. g., ammonium chloride or ammonia solution in the case of copper), and a submerged electrode which is of the same material as the other electrode or of inert material. Such cells suffer from serious drifts in zero reading (and other readings) and changes of sensitivity and require elaborate and complicated apparatus with movable parts, gas-tight packing glands, etc. Thus, such cells are insensitive and erratic when small quantities of oxygen are present in a gas to be tested, are inaccurate due to the generation of local current and are impracticable. Although many attempts were made to overcome the foregoing difficulties and disadvantages encountered in measuring small quantities of oxygen in a given gas, none, as far as I am aware, was successful when carried into practice on a commercial scale.

It has now been discovered that under certain conditions the current caused by the absorption of oxygen and, more particularly, of small quantities of oxygen into a special electrolytic cell is proportional to or a function of the concentration of oxygen in the atmosphere surrounding the electrode. It has, moreover, been found that at very low oxygen concentrations, this current is unexpectedly high.

It is an object of the present invention to provide a method for the accurate detection and measurement of small quantities of oxygen in other gases.

Another object of the invention is to provide a simple method for measuring small concentrations of oxygen in gases without encountering inaccuracies in the measurements due to drift, generation of local currents, insensitivity, irreproducibility, etc.

It is also an object of the present invention to provide a method for measuring small concentrations of oxygen, particularly of the order of up to about 0.003%, in a simple and accurate manner.

It is a further object of the invention to provide apparatus for achieving the foregoing objects.

The invention also contemplates providing a novel and simple apparatus for the measurement of small quantities of oxygen in other gases.

It is also the purpose of this invention to provide apparatus which is highly sensitive and very responsive to the presence of oxygen.

Other objects and advantages will become apparent from the following description taken in conjunction with the accompanying drawings in which:

Figure 1 is a diagrammatic view of an apparatus embodying the invention and suitable for the measurement of small quantities of oxygen in other gases by the method provided by the present invention;

Fig. 2 is a cross-sectional view along section 2—2 of the apparatus shown in Figure 1;

Fig. 3 is a diagrammatic view representing a preferred embodiment of the invention;

Fig. 4 is a detailed sectional view of the embodiment shown in Fig. 3; and

Fig. 5 is a view partly in section illustrating the electrode assembly shown in Fig. 4.

Generally speaking, the present invention contemplates bringing the gas to be tested for oxygen content into contact with an electrode inert to an electrolyte even in the presence of oxygen and partially wetted by the electrolyte, usually aqueous, said electrode forming the cathode of an electrolytic cell, the anode of which is capable of oxidation by the electrolyte only when oxygen is being simultaneously adsorbed at the cathode and the resulting current is used as a measure of oxygen present in the gas.

The invention can be understood by reference to specific embodiments of the invention in which the surface of a silver cathode or a nickel cathode, preferably silver- or gold-plated, may be either partially in contact with or partially immersed in an aqueous solution of potassium hydroxide as electrolyte which is in contact with the surface of a saturated antimony amalgam anode. Oxygen is adsorbed on the cathode by means of a process which is believed to involve the reduction of the oxygen partly to a hydroxyl ion and partly to a hydroperoxyl ion as given by the following two equations:

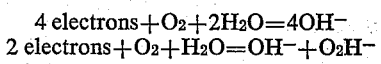

The corresponding process at the anode results in the oxidation of the antimony in the amalgam possibly to antimonite according to the equation:

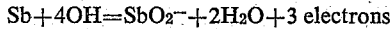

Thus, the net result is that the oxygen absorbed on the cathode and then absorbed into the cell serves to oxidize the antimony of the anode and an electromotive force is developed between the two electrodes. Instead of antimony amalgam, the anode may consist of lead or of material commonly used as the negative of an alkaline nickel-cadmium battery, e. g., a piece of porous nickel impregnated with cadmium by electrodeposition. In this case the anodic equation is believed to be:

The over-all effect here is absorption of oxygen into the system and formation of cadmium-hydrate.

The electrolytes which may be employed in accordance with the present invention may be alkaline, neutral or acid electrolytes, i. e., the electrolytes may comprise solutions of bases, salts or acids. Examples of alkaline electrolytes include aqueous solutions of potassium or sodium hydroxide, potassium carbonate, sodium bicarbonate, etc. Neutral electrolytes may comprise aqueous solutions of such salts as potassium chloride, etc. Acidic electrolytes may comprise aqueous solutions of sulfuric acid, etc. The concentration of the electrolytes can vary over wide ranges and both dilute and concentrated solutions are operative as electrolytes.

The cathode while being capable of adsorbing oxygen should not be of a material liable to substantial chemical attack of its surface by the electrolyte. The cathode material and electrolyte should be so chosen, in combination, as to exclude such attack not only in the absence but also in the presence of oxygen. The fact that the cathode is only partially wetted by the electrolyte ensures the presence of one or more lines of contact (water lines) between the surface of the cathode and the electrolyte, and these lines of contact enable the material of the cathode, the electrolyte and the gaseous atmosphere to meet at the same place to form a three-phase boundary. A substantial portion of the cathode area must be free of any contact with the electrolyte which is substantially stagnant, not agitated, i. e., the meniscus forming the electrolyte-cathode-gas boundary should not be substantially disturbed by movement of the electrolyte. Oxygen molecules are thereby enabled to be adsorbed on the electrode directly from the gas phase without prior dissolution in the electrolyte. While adsorbed, the molecules travel swiftly toward the water line where they are ionized. If the cathode is completely submerged, as for example in polarographic methods of analysis, the oxygen molecules must first dissolve and then in the dissolved state diffuse towards the cathode. This is a sluggish process giving rise to small currents only. Even on applying agitation, at least a thin film of liquid adhering to the cathode would still have to be traversed and the current output would greatly depend on the manner and degree of such agitation. For high sensitivity and drift-free operation, particularly at low oxygen concentrations, the cathode should be comprised of an imporous or non-porous element, i. e., a body devoid of pores. Thus, for example, the cathode may take the form of a solid metal element such as sheet, wire, etc., or it may be in the form of gauze, the elements of which are solid strands. This ensures a geometrically well-defined meniscus free from creep by the electrolyte and such an electrode does not show aging effects as does, for example, porous carbon. It is to be noted that carbon is not entirely inert in the electrolyte as required for the cathode material employed in the present invention but forms "surface oxides," hydroxyl radicals sticking out from the carbon in a non-controllable and changeable manner. The ability of the carbon to be depolarized by oxygen is therefore erratic, variable with time, i. e., subject to "aging." Hence, there is the need for frequent replacement of "worn-out" carbon. Silver, gold, nickel, platinum, and iridium are suitable cathode materials. The cathode may be composed entirely of the suitable cathode materials or merely have a surface, e. g., an electroplated surface of said material. If the gas passed through the apparatus contained some hydrogen, the latter might be consumed at a partially-wetted nickel or platinum electrode giving a reverse current and falsifying the response of the cell to oxygen. The effect of hydrogen consumption is, however, not very critical; nonetheless, silver or gold cathodes are preferable to nickel or platinum cathodes. Gold is a suitable cathode material for use in sulfuric acid electrolytes.

In order to give satisfactory operation of the cell, the material of the anode should be more noble than hydrogen in the electrolyte and should not react chemically with the electrolyte in the absence of oxygen since this would not only cause a loss of anodic depolarizer but would also give rise to a parasitic current which would falsify the results. However, the anode material must be a metal readily attacked by the electrolyte when oxygen is being absorbed into the cell, i. e., a base metal, although it must be non-attackable by the electrolyte in the absence of oxygen. For example, zinc is not suitable in any solution, for on closing the circuit it causes hydrogen to be evolved at the cathode, thus generating a current in the absence of oxygen. In the presence of little oxygen such hydrogen evolution current would be superimposed on and blur the oxygen absorption current, impairing the sensitivity and reproducibility of response to oxygen. Cadmium, lead, antimony or arsenic, but not tin, are suitable anode materials in an alkaline electrolyte. However, a porous nickel support impregnated with cadmium is a preferred anode material. Copper is suitable in sulfuric acid solution and in potassium chloride solution.

Preferred embodiments for carrying the invention into practice comprise galvanic systems having a solid cathode with a noble precious metal surface (particularly gold, silver, or iridium) in combination with an alkaline electrolyte and a cadmium-containing anode, for example, an anode of cadmium supported on porous nickel. Electrolytic systems having a precious metal cathode (particularly gold or silver) and an alkaline electrolyte with an arsenic- or antimony-containing anode have given satisfactory results. Electrolytic systems comprising a nickel cathode together with an alkaline electrolyte and either an antimony-containing or a lead-containing anode are also satisfactory. A system comprising a silver cathode together with an alkaline electrolyte and a lead anode is also satisfactory. Another example of a satisfactory system employing an acid electrolyte is the system comprising a gold cathode, a sulfuric acid electrolyte and a copper anode. A system comprising a platinum cathode, an aqueous potassium chloride electrolyte and a copper anode is an example of a satisfactory system employing a neutral electrolyte. The foregoing galvanic systems are examples which meet the critical requirements for satisfactory combinations contemplated by the invention.

Examples of preferred galvanic systems which may be used in an apparatus embodying the invention are set forth in Table I.

TABLE I

| Cathode | Electrolyte | Anode |
| --- | --- | --- |
| Ag | 5 N KOH | Pb |
| Ag | 5 N KOH | Cd in porous Ni |
| Ag | 0.1 N KOH | Cd in porous Ni |
| Ag | 5 N NaOH | Cd in porous Ni |
| Ag | 1 N $K_2CO_3$ | Cd in porous Ni |
| Ag-plated Ni | 5 N KOH | Cd in porous Ni |
| Au | 5 N KOH | Cd in porous Ni |
| Au-plated Ni | 5 N KOH | Cd in porous Ni |
| Ir-plated Ni | 5 N KOH | Cd in porous Ni |

Other suitable examples of galvanic systems which may be used in an apparatus embodying the invention are set forth in Table II.

TABLE II

| Cathode | Electrolyte | Anode |
| --- | --- | --- |
| Ni | 5 N KOH | Sb-amalgam |
| Pt | 5 N KOH | Cd in porous Ni |
| Ag | 5 N KOH | Bi |
| Ni | 5 N KOH | Pb-amalgam |
| Au-plated Ni | 5 N KOH | Pb |
| Au | 5 N KOH | As |
| Ag | 5 N KOH | Cu |
| Pt | 1 N KCl | Cu |
| Au | 0.1 N $H_2SO_4$ | Cu |
| Ag | 1 N $NaHCO_3$ | Cd in porous Ni |

The anode material, though used up at a very slow rate, may be renewed from time to time. Instead of replacing the material, it may be recovered electrolytically without opening the cell by using a "charging" current flowing in the opposite direction to the output current of the cell. During the charging operation, oxygen is generated at the positive electrode which in normal use functions as the cathode, but which under these reverse conditions is the anode. The charging operation serves to reconvert the anodic depolarizer, e. g., cadmium or copper, electrolytically to its original reduced state. In order to avoid a corresponding oxidation of the cathode, an auxiliary electrode can be provided made of such materals as nickel, platinum, etc., so as to leave the main positive electrode untouched.

The current flowing in the cell when the electrodes are connected by a suitable resistance is found to be proportional to the concentration of the gaseous uncombined oxygen in the atmosphere adjacent to the cathode provided this concentration is below a certain order of magnitude which depends on the geometry of the particular cathode used. Once the range of proportionality or datum value is exceeded, the calibration curve flattens out until finally the current is largely independent of the oxygen concentration. Thus, it is for concentrations below the datum value already referred to that the method of measuring in accordance with the invention is particularly effective. If higher concentrations are to be dealt with, either the gas to be analyzed must be diluted with a gas substantially free of oxygen or, alternatively, the length of the lines of contact between the material of the cathode and the electrolyte must be increased since it is found that at higher concentrations of oxygen, it is this which limits the rate of absorption of oxygen into the cell. A further alternative comprises using a given volume of non-flowing gas as explained in more detail hereinafter.

The current output of the cell may be measured by and/or utilized in any of the methods common for recording or control purposes, i. e., utilizing an electric-responsive indicating means. For example, the output may be used to operate a recorder or an indicator, or it may be fed back to a controlling mechanism for keeping the oxygen content at or below a desired level. Alternatively, a warning signal may be sounded if the oxygen content rises above or falls below a predetermined value.

For the purpose of giving those skilled in the art a better understanding of the invention, reference is now made to the drawings in describing the apparatus provided by the present invention.

In the embodiment of the invention depicted in Figure 1 the electrolytic cell comprises an outer container 1 consisting of, for example, a horizontal glass tube of about ¾-inch internal diameter, having an imporous M-shaped cathode 2 shown in cross section in Fig. 2, e. g., made of a sheet of silver about 6 inches long. Approximately one-quarter of the height of the cathode is submerged in an electrolyte 3 which can be an aqueous solution containing about 25% potassium hydroxide. The container 1 has gas inlet 4 and gas outlet 5 in its upper portion and situated at opposite ends. The outlet 5 may carry a tap 6 and a capillary 7. One end of the tube may be closed and the other may carry a ground socket with stopper 8. In the present embodiment, the lower portion of the tube communicates with a vertical glass tube 9 about ½-inch wide which at its lower portion forms an anode chamber or pocket containing the anode 10 which is totally submerged in electrolyte 3. To provide an electrical connection with the anode, a narrower glass tube 11 is inserted into the vertical tube 9, leaving a narrow gap or sleeve between the two tubes. Tube 11, which is closed at the bottom, contains some mercury and a sealed-in platinum wire 12 connected to the anode. By means of a nickel wire 13 extending into the pool of mercury, contact is made through platinum wire 12 to the anode. In the embodiment shown in Figure 1 of the drawings, the anode is a fragment of the negative from a nickel-cadmium accumulator. Connection to the cathode is made by means of a platinum wire 14 sealed into the container. When the oxygen-containing gas to be tested is introduced into the container and contacted with the electrolyte adjacent the partially submerged cathode, a current is generated in an amount which is a function of the oxygen in the gas adjacent said cathode and when measured will indicate the oxygen content. To measure current generated by the cell, the cathode and anode can be connected to a galvanometer of about 100 ohms resistance and sensitive enough to measure current variations of 1 microampere. The galvanometer may comprise a variable shunt which, on calibration, can be so set that one division of the scale corresponds to a round value of oxygen concentration, e. g., to 1 part per million. Instead of reading the current on a galvanometer, it may also be measured as potential drop across a resistance of 100 ohms using a potentiometer. The sensitivity of the particular set-up described is such that using a rate of gas flow of 50 cubic centimeters per minute, 1 part of oxygen per million is indicated by a current of the order of three microamperes. Fractional parts per million can be detected. In order to rejuvenate the cadmium anode after use, instead of replacing the oxidized anode, a nickel wire 15 is inserted between the two vertical glass tubes to serve as an auxiliary anode. An electrolytic current of about 100 milliamps is passed for half an hour through the auxiliary anode, electrolyte and cell anode which now becomes a cathode. It is thus not necessary to open the cell when the anode is reactivated. The vertical glass tube 9 serves also as a manometer and the height of the liquid meniscus in it may be used as an indication of the speed of gas flow. The gas to be tested or analyzed is led through the cell at constant speed. This can be achieved by providing a flow in excess of that desired and allowing the excess to escape against a constant head of liquid contained in a side arm in a pipe leading to the cell. A flow meter can be connected in series with the testing or analyzing cell. When gases containing impurities likely to contaminate the cell and/or poison the cathode are to be analyzed, scrubbers with suitable absorbents (for example, alkaline plumbite solution for hydrogen sulfide) may be employed to extract the impurities before analyzing the gases. Furthermore, it is preferred that dry gases be moistened before entering the cell. Before use, the apparatus is calibrated by passing through it a gas, which is initially reasonably, though not necessarily entirely, free from oxygen, and to which oxygen is added at a known rate. The oxygen addition may conveniently be provided by means of a small water electrolyzer in series with the testing cell. The current output of the testing cell is then plotted against the current input of the electrolyzer at a known constant gas flow. The scale of the current input of the graph is then adjusted or converted to read directly in terms of percentage of oxygen. If the straight line obtained on calibration does not pass through the origin of the graph of the galvanic output of the cell plotted against the electrolytic input of the electrolyzer but appears to be shifted to the left, the shift gives a measure of the oxygen originally present in the gas used for calibration. It is not, therefore, necessary to know beforehand the degree of purity of that gas. Only the slope of the calibration line is relevant. The operation of the water electrolyzer, which also may contain 25% potassium hydroxide solution, will be evident from Figure 1. On calibration, the oxygen generated at the small platinum wire anode 16 of the electrolyzer is carried into container 1 by the gas stream. A nickel wire 17 inserted in the ascending arm of the electrolyzer serves as cathode. With a flow corresponding to 50 cc./min. of dry calibrating gas at 20° C. and 76 cm. mercury pressure, each microampere of electrolyzer input produces a concentration of 0.0747 part of oxygen per million in the calibrating gas according to Faraday's law.

With the cell or apparatus just described and a speed of flow of about 50 cc./min., the current is directly proportional to the oxygen percentage up to about 0.003%. At higher percentages the sensitivity falls and vanishes almost entirely when the oxygen content is as high as 0.1%. However, the range of proportionality of response can be extended at will by arranging for the total length of the aforementioned lines of contact to exceed that described in this example.

It is further in accordance with the invention that the sensitivity may be increased and the response, i. e., a high "resolving" power to oxygen, accelerated by employing a substantially porous or porous material as a carrier or diaphragm for the electrolyte, and interposing this between and in contact with an openwork cathode and the anode. The carrier material, which should not affect the electrochemistry of the cell, e. g., electrically non-conducting, may be filter paper, a textile fabric, a porous ceramic material, or asbestos, but preferably is a porous plastic. The gas flows over the free or exposed surface of the cathode and becomes adsorbed thereon, after which it migrates towards the water line or three-phase boundary formed by the cathode, the gas, and the electrolyte as hereinbefore described. Fig. 3 represents an illustrative apparatus for achieving the foregoing objects.

In Figs. 3 to 5, particularly Figs. 4 and 5, an electrode assembly, generally designated as 19, is mounted within a tubular glass vessel 20 (hereinafter referred to as the vessel). The electrode assembly advantageously comprises a tubular, concentric arrangement wherein an anode 21 substantially surrounds a central open-ended glass tube 22 (hereinafter referred to as the tube). The upper end of the tube projects out through the upper end of the vessel and the lower end is preferably, though not necessarily, immersed in a small pool of liquid 23 which may be of the same composition as the electrolyte. The tube 22 has an extension 22($a$) and is connected to the latter by a polythene sleeve 36. The anode, which has a flap at its upper end, is preferably lead foil and, during use, is converted into plumbite and need not be regenerated since the life of the anode is so long that regeneration is of little practical importance when gases poor in oxygen are examined. The tube 22 is provided with a collecting saucer-shaped collar 24 to prevent any plumbite solution from contaminating the electrolyzer solution 23. Alternatively, the electrolyzer may be placed entirely outside the cell as in Figure 1.

The outer surface of the anode is substantially surrounded by and in contact with the porous carrier material 25, e. g., a sleeve of porous polyvinyl chloride, having its pores soaked, i. e., permeated, diffused, etc., with an electrolyte, e. g., concentrated aqueous caustic potash solution. The carrier or diaphragm is, in turn, substantially surrounded by and in contact with the inner surface of the cathode 26, e. g., bright silver gauze. A few turns of cotton yarn or metal wire 27 is employed to hold the cathode in contact with the carrier. A gas outlet 28 is provided in the upper end of the vessel and may carry the usual tap 29 and capillary 30. A similar hollow key vacuum tap 31 may be inserted in the gas inlet. The gas to be analyzed is passed down through the tube extension 22($a$) and tube 22, becoming moisture-laden when passing through liquid 23. The gas then flows upward through the annular space between the vessel 20 and cathode assembly 19 through gas outlet 28. To measure current generated by the cell, the cathode and anode may be connected by lead wires 32 to a galvanometer 33 of about 100 ohms resistance.

The gas and electric connections must, of course, be made absolutely gas-tight since any substantial leakage of air into the vessel would be fatal to accurate analysis of the amount of oxygen in the gas. The glass used is preferably heat-resistant and the electric leads 32 through it should have a co-efficient of thermal expansion which is nearly the same as that of heat-resistant glass. Tungsten is a metal which fulfills such a requirement.

When employing devices having substantially the same or similar configurations as described in connection with the modification illustrated in Figure 3, many desirable results, heretofore not obtained, are derived. At low gas speeds the current produced is proportional thereto, but the curve flattens out at high speeds to end asymptotically in a horizontal. It is, therefore, advisable to have the channel for the gas of annular or other cross section rather narrow for this will give high speed at a given rate of flow and so make the sensitivity of the cell more independent of the flow rate. The sensitivity of the apparatus is particularly high when a cathode of bright silver gauze is used. A concentration of a few volumes of oxygen in one hundred million volumes of gas can be readily detected. However, by changing the material and shape of the cathode the sensitivity can be decreased with the result that larger concentrations of oxygen can more conveniently be determined. Thus, instead of using gauze, the diaphragm may be wound with silver wire, the turns being spaced to give any desired total length of the lines where the cathode, gas, and electrolyte are all in contact according to the range of concentration which it is desired to cover. Stainless steel may be used as the cathode instead of silver, giving a less sensitive galvanic element. It will be noted that when apparatus is utilized as depicted in Fig. 4, the water line is greatly extended while at the same time the volume of electrolyte and emerging height of the cathode are considerably reduced. The result is a 3 to 4 fold increase of sensitivity having very considerable speeding-up of response. The materials employed in Fig. 3 are not limited thereto. Any combination of cathode/electrolyte/anode hereinbefore described may be used.

As in the apparatus described in connection with Figure 1, it may be desirable to be able to generate known amounts of oxygen electrolytically for calibration purposes. The bottom of the main vessel 20 may therefore form one arm of a U-tube, and a platinum wire 34 forming the anode in this electrolysis may pass downward through the glass tube carrying the electrode assembly into the pool of liquid at the bottom, a cathode wire 35 passing down the other arm of the U-tube. Alternatively, as previously described, the electrolysis apparatus may be separated from the tube housing the oxygen-sensitive element.

There may be two or more separate cathodes of different sensitivities, with a common anode, so that with the aid of a switch or switches one or the other cathode may be used, and thus the same apparatus can be employed for several ranges of oxygen concentration.

Quantitative checks of the cell constant may be carried out without the help of electrolysis, e. g., by arranging for one or more artificial air leaks in the duct leading the gas to the apparatus. Such a leak can, for instance, be provided by fusing a platinum wire into heat-resistant glass. Owing to the differences in the expansion co-efficients, a narrow gap will exist between the glass and platinum sufficient to insure a small, steady ingress of oxygen into the system. Of course, in normal operation the leak is sealed, e. g., by covering it with mercury.

Another specific embodiment of a galvanic cell suitable for carrying out the method in accordance with the invention will now be described. The cell comprises an outer container consisting of a horizontal glass tube of ¾-inch internal diameter having a sheet-nickel cathode wound into the shape of a scroll sealed into the glass. This scroll has a diameter of ½ inch with three to four turns and a length in the region of 4 inches, the length of the glass tube being slightly longer. The tube has a gas inlet and a gas outlet positioned in its upper surface and situated at opposite ends and is closed at both ends, one end being formed with a downwardly extending pocket or chamber for the reception of a quantity of antimony amalgam constituting the anode. The electrolyte consists essentially of an aqueous solution containing about 25% potassium hydroxide which completely covers the amalgam anode while the upper half of each turn of the cathode scroll emerges from the solution. With three turns the total length of the line of contact with the electrolyte on the two sides of the nickel sheets is thus $4 \times 3 \times 4 = 48$ inches. Sealed-in wires lead from the two electrodes to a microammeter with a range of 0–100 microamperes and an internal resistance of 1000 ohms or less.

An important point in this invention is the choice of the anode material. This must be a base metal though not base enough to discharge hydrogen ions or water molecules of the solution, i. e., it must not be capable of liberating hydrogen. If this point is overlooked, e. g., if zinc or tin is chosen as the anode in any solution, or cadmium in a neutral or acid solution, or lead in an acid solution, a substantial blank current is generated in absence of oxygen and only very slight and erratic response to small amounts of oxygen is at best obtained. The suppression of blank current is a matter of primary importance and not of mere convenience. That the special choice of anode-electrolyte combination achieves this aim was tested in experiments with gases as free from oxygen as could be obtained. In carefully designed blank experiments with hydrogen purified over a catalyst of palladized alumina and with nitrogen scrubbed with chromous chloride solution, the current was found to descend to well below 1 microamp while the sensitivity to oxygen was about 3 microamps for each part per million of oxygen. The residual current thus corresponded to substantially less than 0.00003% of oxygen. Such low blank value is only obtained if the anode material is of the above-specified category, otherwise it might be 100 or 1000 times as much.

In all the embodiments of the invention the gas to be analyzed should not contact any substantial length of an anode water line, i. e., anode/electrolyte/gas, prior to its contacting the water line of the cathode. Otherwise a local galvanic element +/oxygen/emerging part of base metal/electrolyte/submerged part of base metal/− is set up which consumes oxygen without giving a measurable current. It will be noted that in Fig. 3 the exposed length of the anode is very short with that compared to the many wires of silver gauze cathode and that the gas passes the anode only after having passed over the surface of the cathode. The galvanic output is therefore entirely unaffected in this setup. In Fig. 1 the anode (but not the cathode) may be exposed to air creating a local cell operated by the air having an anode in common with the measuring cell but the former cell would interfere little with the latter cell.

Although the cells just described are primarily designed for determining the oxygen content of gas flowing continuously through the cell, they may also be used for analyzing a limited or given volume of gas introduced into the cell but not flowing through it. In this case, the initial output current when the gas is introduced is a measure of the oxygen concentration. A more precise method of determination is to plot the output current against time until the electromotive force of the cell has decayed to zero. The area under the curve obtained is thus a direct measure of the total oxygen content. In order to avoid plotting the curve and measuring the area by means of an integration, a low constant current may be passed through the cell by means of an auxiliary electromotive force and the terminal voltage of the cell observed. When this terminal voltage has decayed, the auxiliary part of the circuit is cut out. Under these conditions, the area to be integrated is rectangular except for the part obtained after the auxiliary part of the circuit is cut out. However, this part of the area is not dependent on the original concentration of oxygen in the gas under test, but a constant.

The present invention is particularly applicable to the measurement of small amounts of oxygen in other gases. The invention is also applicable to the indirect measurement of large concentrations of oxygen, which can be achieved by allowing only a small aliquot part of the oxygen-rich test gas to enter the apparatus and then proceeding as for gases very dilute in oxygen. Although the present invention contemplates the measurement of oxygen in gas, it is also indirectly suitable for use in measuring amounts of certain other gases which are capable of chemical combination with oxygen. Thus, traces of hydrogen may be determined by injecting oxygen into the gas stream, passing the gas over a hot filament, or through an incandescent tube, and determining the surplus oxygen by the utilization of the present invention. Large amounts of hydrogen may be "titrated" by injection of increasing amounts of oxygen followed by continuous combustion, the end point being indicated by the beginning of galvanic response. Oxygen already present in the gas may be accounted for by by-passing the combustion element. Other gases, such as CO, $CH_4$, etc., can be determined similarly. Oxygen in liquids, e. g., boiler feed water, fermentation media, biofluids, etc., may be driven into a carrier gas, e. g., by using supersonics, and then determined.

It is to be observed that the present invention provides an accurate method for detecting and measuring small amounts of uncombined or molecular oxygen in another gas by passing said gas though a novel and relatively simple apparatus to cause an electrical current to flow in said apparatus which is a function of the amount of oxygen in the gas tested.

The present application is a continuation in part of my copending application Serial No. 330,300 filed January 8, 1953, now abandoned.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A method for detecting and measuring the presence of small amounts of oxygen in a gas which comprises establishing contact between a substantially stagnant, aqueous, alkaline electrolyte and a base-metal anode selected from the group consisting of lead, arsenic, bismuth, antimony, cadmium and copper having the property of being attacked by the electrolyte in the presence of uncombined oxygen but being more noble than hydrogen in the electrolyte, maintaining a cathode of imporous precious metal having a portion of its area free of contact with said electrolyte and having a portion of its area partially submerged in said electrolyte thereby providing at least one line of contact between said cathode and electrolyte, said line of contact enabling said free area of said cathode, the electrolyte and the gaseous atmosphere surrounding said cathode to form a three-phase boundary, said precious metal cathode having the property of not being attacked by the electrolyte either in the presence or absence of uncombined oxygen, conducting a stream of gas containing uncombined oxygen past the said line of contact to cause the generation of an electric current between said anode and cathode which current is a function of the concentration of the gaseous uncombined oxygen in the stream of gas adjacent the cathode, and measuring the current generated between said anode and cathode.

2. A method for detecting and measuring the presence of oxygen in a gas while substantially obviating inaccuracies in the measurement due to drift, generation of local currents, insensitivity and irreproducibility which comprises establishing contact between an aqueous, substantially stagnant electrolyte diffused into a porous carrier material and a base-metal anode selected from the group consisting of lead, arsenic, bismuth, antimony, cadmium and copper having the property of being attacked by the electrolyte in the presence of uncombined oxygen but being more noble than hydrogen in said electrolyte, maintaining a cathode of imporous precious metal having a portion of its area free of contact with said electrolyte and having a portion of its area partially submerged in said electrolyte thereby providing at least one line of contact between said cathode and said electrolyte, said line of contact enabling said free area of said cathode, the electrolyte and the gaseous atmosphere surrounding said cathode to form a three-phase boundary, said precious metal cathode having the property of not being attacked by the electrolyte either in the presence or absence of uncombined oxygen, conducting a stream of gas containing uncombined oxygen past the said line of contact to cause the generation of an electric current which current is a function of the concentration of the gaseous uncombined oxygen in the stream of gas adjacent the cathode, and measuring the current generated between said anode and cathode.

3. A method as described in claim 2 wherein the electrolyte is aqueous potassium hydroxide.

4. A method as described in claim 3 wherein the metal cathode is silver and the base-metal anode is lead.

5. A method as described in claim 4 wherein the porous carrier material is polyvinyl chloride.

6. A method for detecting and measuring the presence of oxygen in a gas which comprises establishing contact between an aqueous, substantially stagnant electrolyte permeated into a substantially porous carrier material and a base-metal anode having the property of being attacked by the electrolyte in the presence of uncombined oxygen but being more noble than hydrogen in said electrolyte, maintaining a cathode of precious metal having a portion of its area free of contact with said electrolyte and having a portion of its area partially in contact with the electrolyte thereby providing at least one line of contact between said cathode and electrolyte, said cathode having the property of not being attacked by the electrolyte either in the presence or absence of uncombined oxygen, conducting a stream of gas containing uncombined oxygen past the said line of contact thereby forming a three-phase boundary whereby an electric current is caused to be generated which current is a function of the concentration of the gaseous uncombined oxygen in the stream of gas adjacent the cathode, and measuring the current generated between said anode and cathode.

7. A method for detecting and measuring the presence of small amounts of uncombined oxygen in a gas while substantially obviating inaccuracies in the measurement due to drift, generation of local currents, insensitivity and irreproducibility which comprises establishing contact between a substantially stagnant, aqueous, potassium hydroxide electrolyte and a lead anode, maintaining a cathode of imporous silver having a portion of its area free of contact with said electrolyte and having a portion of its area partially submerged in said electrolyte thereby providing at least one line of contact between said cathode and electrolyte, said line of contact enabling said free area of said cathode, the electrolyte and the gaseous atmosphere surrounding said cathode to form a three-phase boundary, conducting a stream of gas containing uncombined oxygen past the said line of contact to cause the generation of an electric current between said anode and cathode which current is a function of the concentration of the gaseous uncombined oxygen in the stream of gas adjacent the cathode, and measuring the current generated between said anode and cathode.

8. A method for detecting and measuring the presence of small amounts of uncombined oxygen in a gas while substantially obviating inaccuracies in the measurement due to drift, generation of local currents, insensitivity and irreproducibility which comprises establishing contact between a substantially stagnant, aqueous, neutral electrolyte and a copper anode having the property of being attacked by said electrolyte in the presence of uncombined oxygen but being more noble than hydrogen in said electrolyte, maintaining a cathode of imporous platinum having a portion of its area free of contact with said electrolyte and having a portion of its area partially submerged in said electrolyte thereby providing at least one line of contact between said cathode and electrolyte, said line of contact enabling said free area of said cathode, the electrolyte and the gaseous atmosphere surrounding said cathode to form a three-phase boundary, said platinum cathode having the property of not being attacked by said electrolyte either in the presence or absence of uncombined oxygen, conducting a stream of gas containing uncombined oxygen past the said line of contact to cause the generation of an electric current which current is a function of the concentration of the gaseous uncombined oxygen in the stream of gas adjacent the cathode, and measuring the current generated between said anode and cathode.

9. A method for detecting and measuring the presence of small amounts of uncombined oxygen in a gas while substantially obviating inaccuracies in the measurements due to drift, generation of local currents, insensitivity and irreproducibility which comprises establishing contact between a substantially stagnant, aqueous, acid electrolyte and a copper anode having the property of being attacked by said electrolyte in the presence of uncombined oxygen but being more noble than hydrogen in said electrolyte, maintaining a cathode of imporous gold having a portion of its area free of contact with said electrolyte and having a portion of its area partially submerged in the electrolyte thereby providing at least one line of contact between said cathode and said electrolyte, said line of contact enabling said free area of said cathode, the electrolyte and the gaseous atmosphere surrounding said cathode to form a three-phase boundary, said gold cathode having the property of not being attacked by the said electrolyte either in the presence or absence of uncombined oxygen, conducting a stream of gas containing uncombined oxygen past the said line of contact to cause the generation of an electric current which is a function of the concentration of the gaseous uncombined oxygen in the stream of gas adjacent the cathode, and measuring the current generated between said anode and cathode.

10. A method for detecting and measuring the presence of oxygen in a gas which comprises establishing contact between a substantially stagnant, aqueous electrolyte and a base-metal anode having the property of being attacked by the electrolyte in the presence of uncombined oxygen but not attacked by the electrolyte in the absence of uncombined oxygen, maintaining a metal cathode having a portion of its area free of contact with said electrolyte and having a portion of its area partially submerged in said electrolyte thereby providing at least one line of contact between said cathode and said electrolyte, said cathode having the property of not being attacked by said electrolyte either in the presence or absence of oxygen, conducting a stream of gas containing uncombined oxygen past the said line of contact thereby forming a three-phase boundary whereby an electric current is caused to be generated which current is a function of the concentration of the gaseous uncombined oxygen in the stream of gas adjacent the cathode, and measuring the current generated between said anode and cathode.

11. A method for detecting and measuring the presence of small amounts of uncombined oxygen in a gas which comprises establishing contact between a substantially stagnant, aqueous electrolyte and a base-metal anode selected from the group consisting of lead, arsenic, bismuth, antimony, cadmium and copper, said anode having the property of being attacked by the electrolyte in the presence of uncombined oxygen but is more noble than hydrogen in said electrolyte, maintaining a cathode of imporous precious metal having a portion of its area free of contact with said electrolyte and having a portion of its area partially submerged in said electrolyte thereby providing at least one line of contact between said cathode and said electrolyte, said cathode having the property of not being attacked by the electrolyte either in the presence or absence of uncombined oxygen, moistening a gas containing uncombined oxygen and then conducting a stream of the moisture-laden oxygen-containing gas past the said line of contact thereby forming a three-phase boundary whereby an electric current is caused to be generated which current is a function of the concentration of the gaseous uncombined oxygen in the stream of gas adjacent the cathode, and measuring the current generated between said anode and cathode.

12. An apparatus capable of continuously detecting and measuring the presence of small amounts of uncombined oxygen in gases comprising, in combination, a container having inlet and outlet means to accommodate the continuous flow of a stream of gas containing uncombined oxygen, a cathode of imporous precious metal having an area free of an aqueous electrolyte and having an area partially submerged in said aqueous electrolyte maintained substantially stagnant thereon, said free area and said partially submerged area being exposed to said stream of gas whereby a three-phase boundary is formed when said stream of gas is passed through the apparatus, said precious metal cathode having the property of not being attacked by the electrolyte either in the presence or absence of uncombined oxygen, a base-metal anode selected from the group consisting of lead, arsenic, bismuth, antimony, cadmium and copper in contact with said aqueous electrolyte and having the property of being attacked by the electrolyte in the presence of uncombined oxygen but being more noble than hydrogen in said electrolyte, a pool of liquid in communication with said container to thereby preliminarily moisture-laden the said stream of gas prior to conducting it past the free area of said exposed cathode, an external electrical connection other than said electrolyte completing a circuit between said anode and said cathode, and electric-responsive means in said circuit, whereby a measurable current, which is the function of the content of uncombined oxygen in the gas being tested, can be caused to flow in the electric circuit and can be measured to determine the concentration of uncombined oxygen when a stream of gas is conducted through said apparatus.

13. An apparatus capable of continuously detecting and measuring the presence of small amounts of uncombined oxygen in gases comprising, in combination, a container having inlet and outlet means to accommodate the continuous flow of a stream of gas containing uncombined oxygen, a cathode of imporous precious metal having an area free of an aqueous electrolyte and having an area partially submerged in said aqueous electrolyte maintained substantially stagnant thereon, said free area and said partially submerged area being exposed to said stream of gas whereby a three-phase boundary is formed when said stream of gas is passed through the apparatus, said precious metal cathode having the property of not being attacked by the electrolyte either in the presence or absence of uncombined oxygen, a copper anode in contact with said aqueous electrolyte and having the property of being attacked by the electrolyte in the presence of uncombined oxygen but being more noble than hydrogen in said electrolyte, a pool of liquid in communication with said container to thereby preliminarily moisture-laden the said stream of gas prior to conducting it past the free area of said exposed cathode, an external electrical connection other than said electrolyte completing a circuit between said anode and said cathode, and electric-responsive means in said circuit, whereby a measurable current, which is the function of the content of uncombined oxygen in the gas being tested, can be caused to flow in the electric circuit and can be measured to determine the concentration of uncombined oxygen when a stream of gas is conducted through said apparatus.

14. An apparatus capable of continuously detecting and measuring the presence of uncombined oxygen in gases comprising, in combination, a container having inlet and outlet means to accommodate a continuous flow of a stream of gas containing uncombined oxygen, an assembly mounted within said container and comprised of a cathode of imporous metal having an area free of an aqueous electrolyte and having an area partially submerged in said aqueous electrolyte maintained substantially stagnant thereon, said free area and said partially submerged area being exposed to said stream of gas whereby a three-phase boundary is formed when said stream of gas is passed through the apparatus, said cathode having the property of not being attacked by the electrolyte in the presence or absence of oxygen, a base-metal anode contacting said electrolyte and having the property of being attacked by the electrolyte when in contact therewith in the presence of oxygen but is more noble than hydrogen in the electrolyte, an electrical connection other than said electrolyte completing a circuit between said cathode and said anode, and means for measuring the current in said circuit whereby a measurable current, which is the function of the content of uncombined oxygen in the gas being tested, can be caused to flow in said circuit and can be measured to determine the concentration of uncombined oxygen when a stream of gas is passed through said apparatus.

15. An apparatus for continuously detecting and measuring the presence of uncombined oxygen in a gas and adapted to substantially obviate inaccuracies in the measurement due to drift, generation of local currents, insensitivity and irreproducibility comprising, in combination, a container having inlet and outlet means to accommodate the continuous flow of a stream of gas containing uncombined oxygen, a cathode of imporous precious metal having an area free of an aqueous electrolyte and having an area partially submerged in said electrolyte, said free area and said partially submerged area being exposed to said stream of gas whereby a three-phase boundary is formed when said stream of gas is passed through said apparatus, said precious metal cathode having the property of not being attacked by the electrolyte either in the presence or absence of uncombined oxygen, a base-metal anode selected from the group consisting of lead, arsenic, bismuth, antimony, cadmium and copper and having the property of being attacked by the electrolyte in the presence of uncombined oxygen but being more noble than hydrogen in said electrolyte, a porous carrier material interposed between and in contact with said anode and said cathode and permeated with said aqueous electrolyte maintained substantially stagnant, an external electrical connection other than said electrolyte completing a circuit between said anode and said cathode, and electric-responsive means in said circuit, whereby a measurable current, which is the function of the content of uncombined oxygen in the gas being tested, can be caused to flow in the electric circuit and can be measured to determine the concentration of uncombined oxygen when a stream of gas is conducted through said apparatus.

16. An apparatus for continuously detecting and measuring the presence of small amounts of uncombined oxygen in a gas and adapted to substantially obviate inaccuracies in the measurement due to drift, generation of local currents, insensitivity and irreproducibility comprising, in combination, a container having inlet and outlet means to acommodate the continuous flow of a stream of gas containing uncombined oxygen, a cathode of imporous silver, having an area free of an aqueous potassium hydroxide electrolyte and having an area partially submerged in said electrolyte, said free area and said partially submerged area being exposed to said stream of gas whereby a three-phase boundary is formed when said stream of gas is passed through said apparatus, a lead anode, a porous carrier material permeated with said aqueous potassium hydroxide electrolyte maintained in a substantially stagnant state, said carrier material being disposed between and in contact with said cathode and said anode, a pool of liquid in communication with said container to thereby preliminarily moisture-laden the said stream of gas prior to conducting it past the free area of said exposed cathode, an external electrical connection other than said electrolyte completing a circuit between said anode and said cathode, and electric-responsive means in said circuit, whereby a measurable current, which is the function of the content of uncombined oxygen in the gas being tested, can be caused to flow in the electric circuit and can be measured to determine the concentration of uncombined oxygen when a stream of gas is conducted through said apparatus.

17. A method for detecting and measuring the presence of uncombined oxygen in a gas which comprises establishing contact between an aqueous electrolyte and a base-metal anode selected from the group consisting of lead, arsenic, bismuth, antimony, cadmium and copper, said anode having the property of being attacked by the electrolyte in presence of uncombined oxygen but being more noble than hydrogen in said electrolyte, maintaining a cathode of imporous precious metal having the property of not being attacked by the electrolyte either in the presence or absence of uncombined oxygen partially submerged in the electrolyte such that a portion of the area of the cathode is free of contact with said electrolyte while the remainder of its area is submerged in said electrolyte thereby providing at least one line of contact between said cathode and electrolyte, said line of contact enabling said free area of said cathode, the electrolyte and the gaseous atmosphere surrounding said cathode to form a three-phase cathode-electrolyte-gas boundary, maintaining said electrolyte in contact with said cathode in a substantially stagnant condition such that the meniscus forming the three-phase cathode-electrolyte-gas boundary is not substantially disturbed by movement of the electrolyte, conducting a stream of gas containing uncombined oxygen past said line of contact to cause the generation of an electric current which current is the function of the concentration of the gaseous uncombined oxygen in the stream of gas adjacent the cathode, and measuring the current generated between said anode and cathode.

References Cited in the file of this patent

UNITED STATES PATENTS

| | | |
|---|---|---|
| 2,069,562 | Schnorf | Feb. 2, 1937 |
| 2,430,895 | Tuve et al. | Nov. 18, 1947 |
| 2,508,238 | Fagen | May 16, 1950 |
| 2,651,612 | Haller | Sept. 8, 1953 |